United States Patent [19]
Morimoto et al.

[11] Patent Number: 5,646,714
[45] Date of Patent: Jul. 8, 1997

[54] LENS SUPPORTING ASSEMBLY

[75] Inventors: Keiji Morimoto; Mitsuhiko Itojima, both of Wakayama, Japan

[73] Assignee: Noritsu Koki Co., Ltd., Wakayama, Japan

[21] Appl. No.: 527,804

[22] Filed: Sep. 13, 1995

[30] Foreign Application Priority Data

Sep. 13, 1994 [JP] Japan ................. 6-218844

[51] Int. Cl.⁶ .................................. G03B 27/40
[52] U.S. Cl. ................ 355/55; 359/827; 248/178.1
[58] Field of Search ................ 355/55, 57, 60, 355/63; 359/799, 800, 819, 827; 248/178.1; 396/529, 530, 531

[56] References Cited

U.S. PATENT DOCUMENTS

| | | | |
|---|---|---|---|
| 4,647,187 | 3/1987 | Zahn et al. | 355/55 X |
| 5,246,192 | 9/1993 | Aberi et al. | 248/178.1 |
| 5,329,337 | 7/1994 | Yamamoto et al. | 355/55 |
| 5,465,126 | 11/1995 | Fukuda | 359/819 X |

Primary Examiner—Arthur T. Grimley
Assistant Examiner—David A Lane
Attorney, Agent, or Firm—Wenderoth, Lind & Ponack

[57] ABSTRACT

A lens supporting assembly for use in a photoprinting machine can position a varifocal lens with high accuracy over a long period time. A lens plate carrying a varifocal lens has bent portions along both side edges and is formed with a plurality of positioning holes. A lens support table has positioning pins adapted to be engaged in the positioning holes. It is further provided with first magnets for attracting the bottom of the lens plate and a second magnet for attracting one of the bent portions. By lowering the lens plate onto the lens support table, the positioning pins engage in the positioning holes, so that the varifocal lens can be set in position with high accuracy. In this state, the first magnets attract the bottom of the lens plate, while the second magnet attracts the bent portion, so that the varifocal lens can be stably held in position.

1 Claim, 7 Drawing Sheets

5,646,714

LENS SUPPORTING ASSEMBLY

BACKGROUND OF THE INVENTION

This invention relates to a lens supporting assembly for use in a photoprinting machine.

A photoprinting machine is used to print negative images recorded on a negative film onto printing paper through a printing lens by irradiating the negative film with light. A suitable varifocal lens is selected from a plurality of different kinds of varifocal lenses corresponding to different negative film sizes, and set in the exposure unit of the printing machine. Thus, it is necessary to detachably set such a varifocal lens in the exposure unit so that it can be exchanged for a different one.

FIGS. 10 and 11 show a conventional lens supporting assembly used for this purpose. It has a lens support table 40 and a pair of rails 41 mounted on the lens support table 40. Front and rear positioning pins 42, 43 are provided on the inner surface of each rail 41. A leaf spring 44 is provided in front of the front positioning pins 42. Another leaf spring 45 is secured to one of the rails 41 between the front and rear positioning pins 42 and 43.

A lens plate 47 for supporting a varifocal lens 46 for printing is inserted between the pair of rails 41. It has side plates 48 on both sides. Each side plate 48 has a tapered front edge 49 and is formed with a cutout 50 along the rear edge.

The lens plate 47 is inserted between the pair of rails 41 while keeping it inclined front down, and pushed forward while sliding it on and along the positioning pins 42 so that the front ends of the side plates 48 are inserted under the leaf spring 44. By pushing the lens plate 47 further forward, the rear edges of the side plates 48 pass the rear positioning pins 43 and the rear end of the lens plate 47 is lowered until the lens plate regains its horizontal position. In this state, the lens plate 47 is pushed backward, biased by the leaf spring 44, until the cutout 50 engages the rear positioning pins 43.

To remove the lens plate 47, it is pushed forward to disengage the cutouts 50 from the rear positioning pins 43, inclined by raising its rear end, and pulled out rearwardly.

When attaching and detaching the lens plate 47, it has to be slid on the front positioning pins 42, so that the contact portions of the lens plate 47 and the front positioning pins 42 tend to be worn quickly. With the progression of wear, it becomes increasingly difficult to set the lens plate 47 with high positioning accuracy.

When attaching and detaching the lens plate 47, its rear end has to be raised and lowered. This may cause deformation of the lens plate 47, making it difficult to set the lens plate with high positioning accuracy.

An object of this invention is to provide a lens supporting assembly which can support the lens plate with high accuracy over a long period of time by preventing wear between the lens support table and the lens plate.

SUMMARY OF THE INVENTION

According to this invention, there is provided a lens supporting assembly for use in a photoprinting machine and comprising a lens support table having a window for exposure and arranged to extend across the optical axis of exposure light, and a lens plate carrying a printing lens and detachably mounted on the lens support table. The lens plate has bent portions along both side edges thereof and a plurality of positioning holes. The lens support table has a plurality of positioning pins adapted to be inserted in the positioning holes, a first magnet for attracting the bottom of the lens plate and a second magnet for attracting one of the bent portions.

By lowering the lens plate onto the lens support table, the positioning pins engage in the positioning holes, so that the lens plate can be set in position with high accuracy. Once set in position, the first magnets attract the lens plate, while the second magnet attract one of its bent portions, so that the lens plate can be stably held in position.

Other features and objects of the present invention will become apparent from the following description made with reference to the accompanying drawings, in which:

DETAILED DESCRIPTION OF THE PREFERRED EMBODIMENT

Embodiments are now described with reference to FIGS. 1-9.

Figure 1:
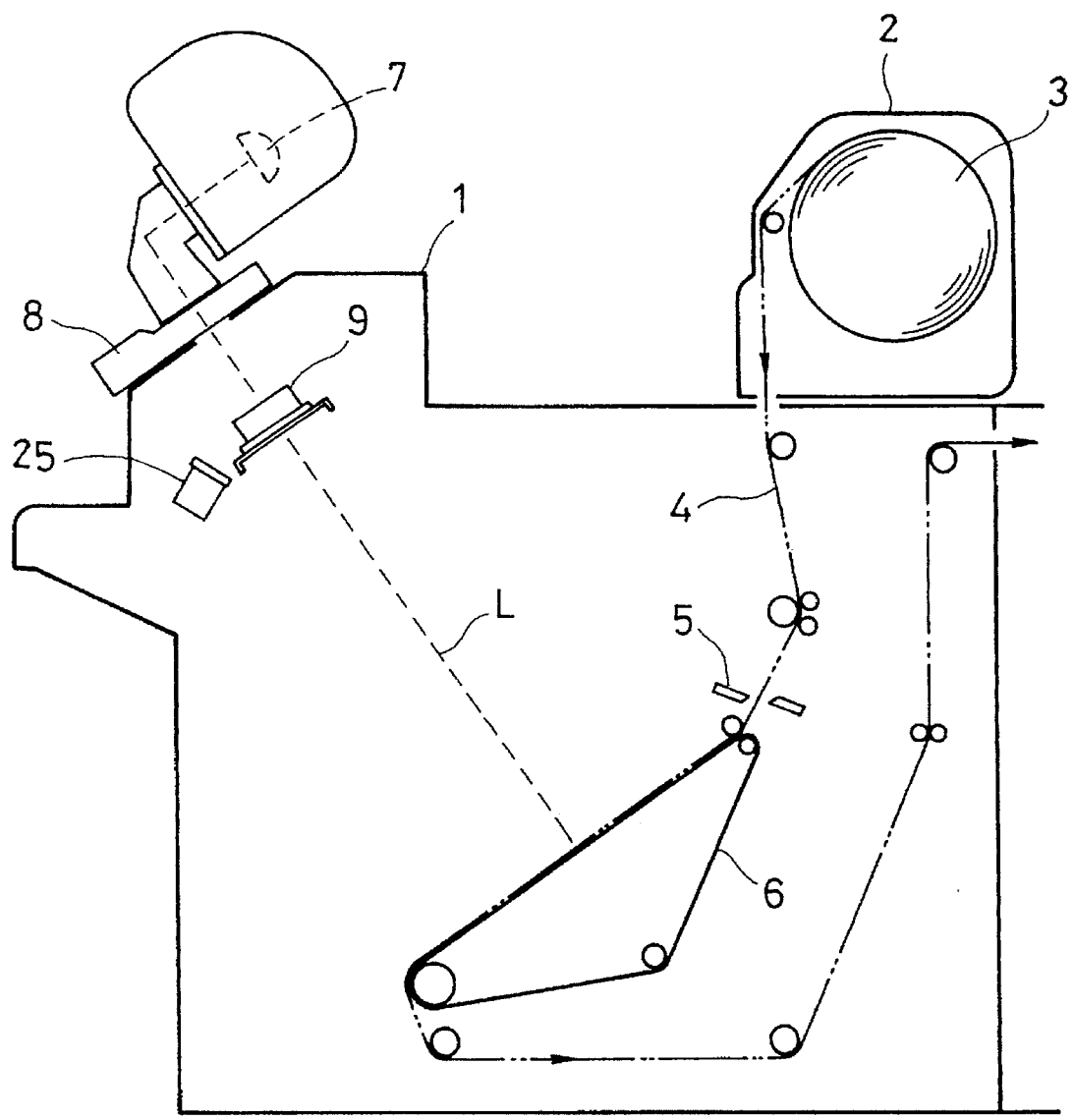
FIG. 1 is a schematic view of a photoprinting machine.

FIG. 1 schematically shows a photoprinting machine. A paper magazine 2 is set on casing 1 of the photoprinting machine. A web-of printing paper 4 unrolled form a roll 3 housed in the paper magazine 2 is cut by a cutter 5 to a predetermined length, and fed toward the exposure station by a feed mechanism 6.

On the other hand, light from a light source 7 is reflected by a reflecting mirror, not shown, to irradiate a negative film (not shown) being fed into a negative mask 8. Images recorded on the film are thus transferred through a varifocal lens 9 and a zoom lens 21 to the printing paper, which has now been fed to the exposure station, and printed thereon.

Figure 2:
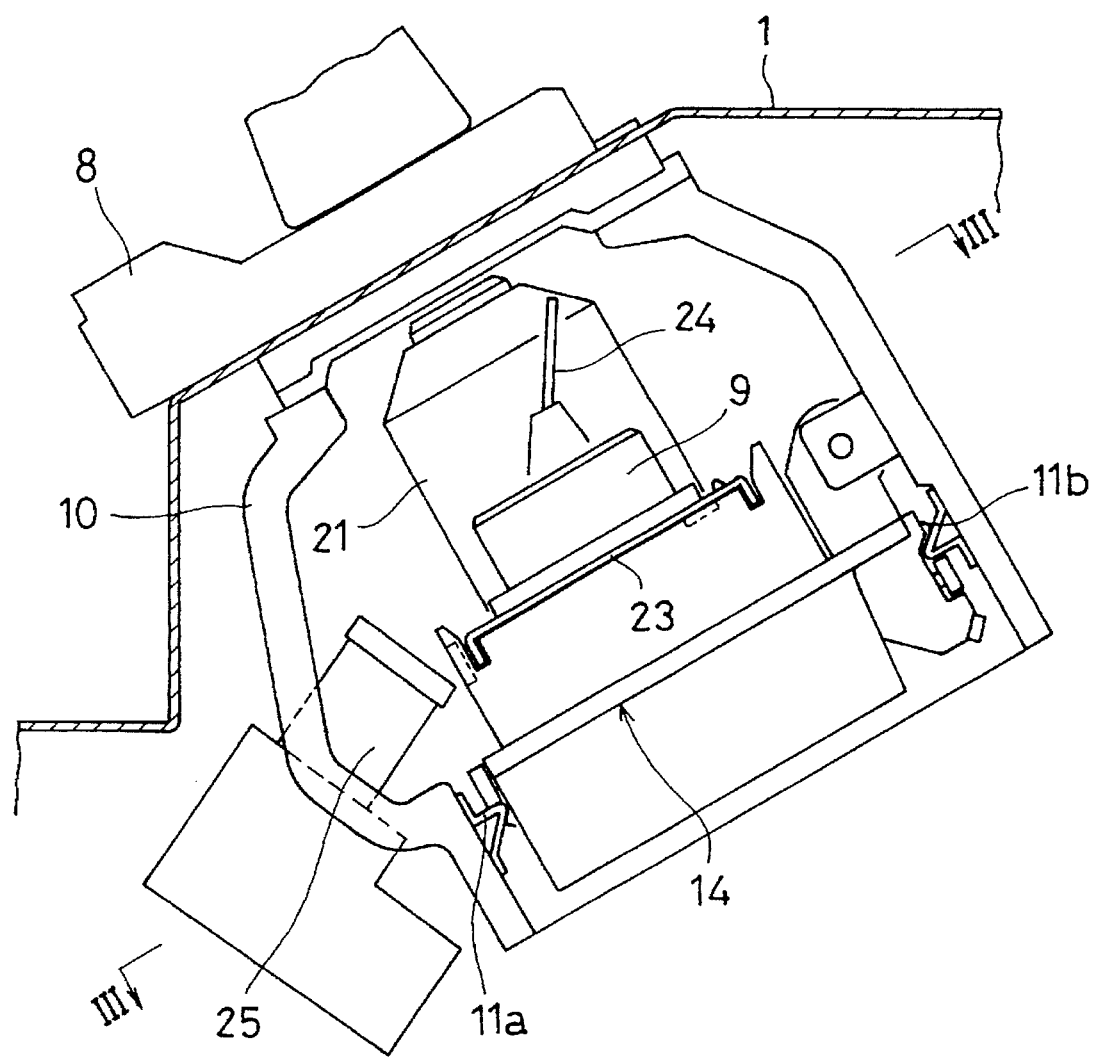
FIG. 2 is an enlarged view of a lens supporting assembly of the present invention.
Figure 7:
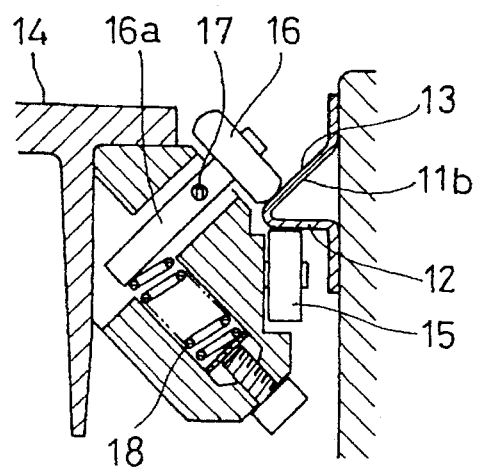
FIG. 7 is a sectional view taken along line VII—VII of FIG. 3.

FIG. 2 shows the detailed structure of the assembly for supporting the varifocal lens 9. It includes a frame 10 fixed in the casing 1, and a pair of rails 11a and 11b mounted on the bottom end of the frame 10 at both sides. As shown in FIG. 7, the rails 11a and 11b each have a first guide surface 12 and a second guide surface 13 inclined relative to the first guide surface 12.

A lens support table 14 is provided between the rails 11a and 11b. It carries on either side a first guide roller 15 and a second guide roller 16 that are movable along the first guide surface 12 and the second guide surface 13, respectively, so that the lens support table 14 is movable along the rails 11a and 11b.

FIG. 7 shows an arrangement for preventing the lens support table 14 from rattling while moving. In this arrangement, only the shaft 16a of the second guide roller 16 that is movable along the second guide surface 13 of the rail 11b is supported so as to be pivotable about a pin 17. A spring 18 biases the rear end of this shaft 16a to press the second guide roller 16 against the second guide surface 13.

The lens support table 14 is inclined relative to the horizontal plane so as to intersect the optical axis L of the exposure light (FIG. 1) at a right angle. The lens support table 14 is in threaded engagement with a threaded shaft 19 shown in FIG. 3. By rotating the shaft 19 with a motor 20 coupled to one end thereof, the lens support table 14 can be moved along the rails 11a, 11b.

Figure 3:
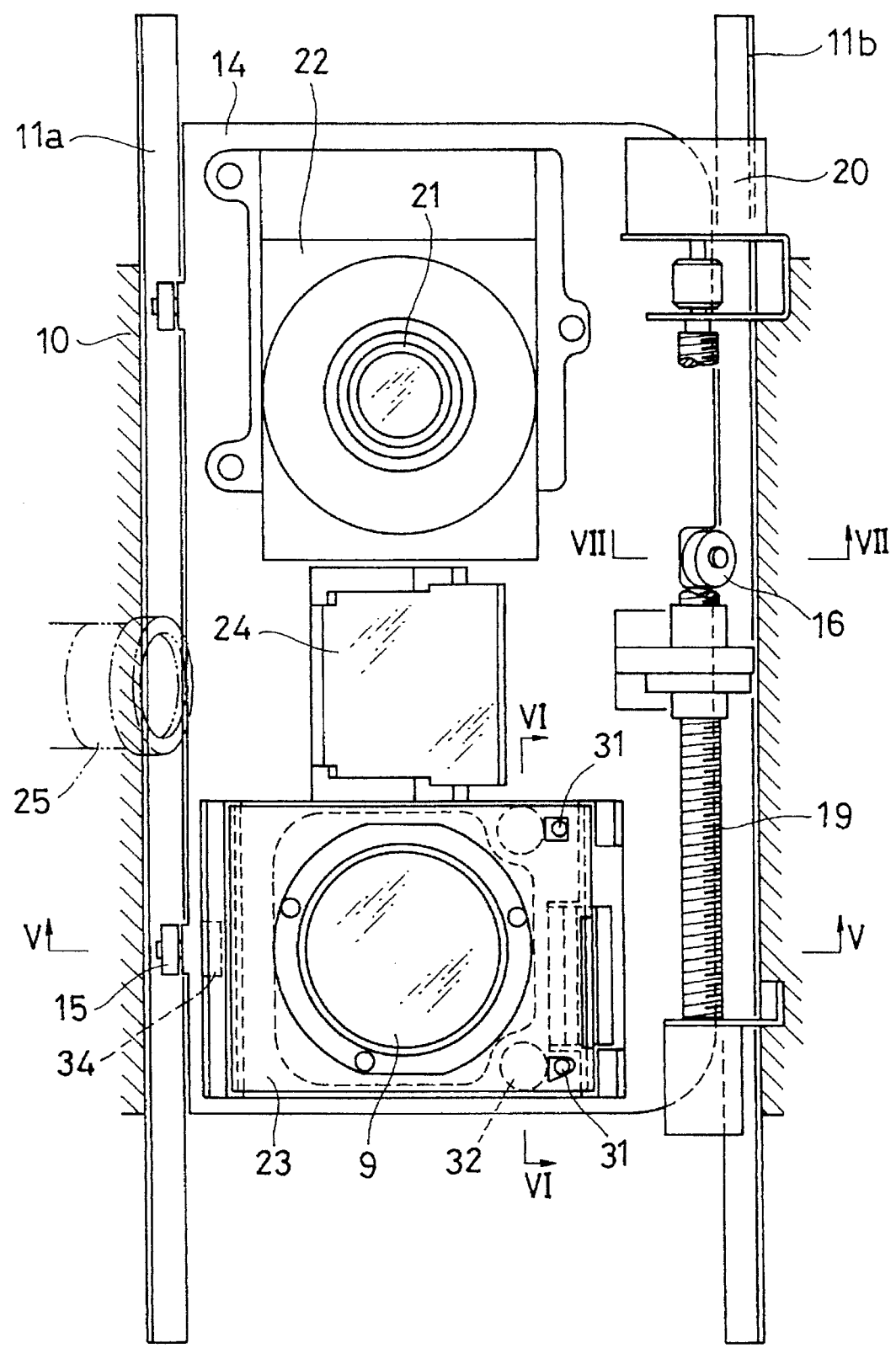
FIG. 3 is a sectional view taken along line III—III of FIG. 2.
Figure 4:
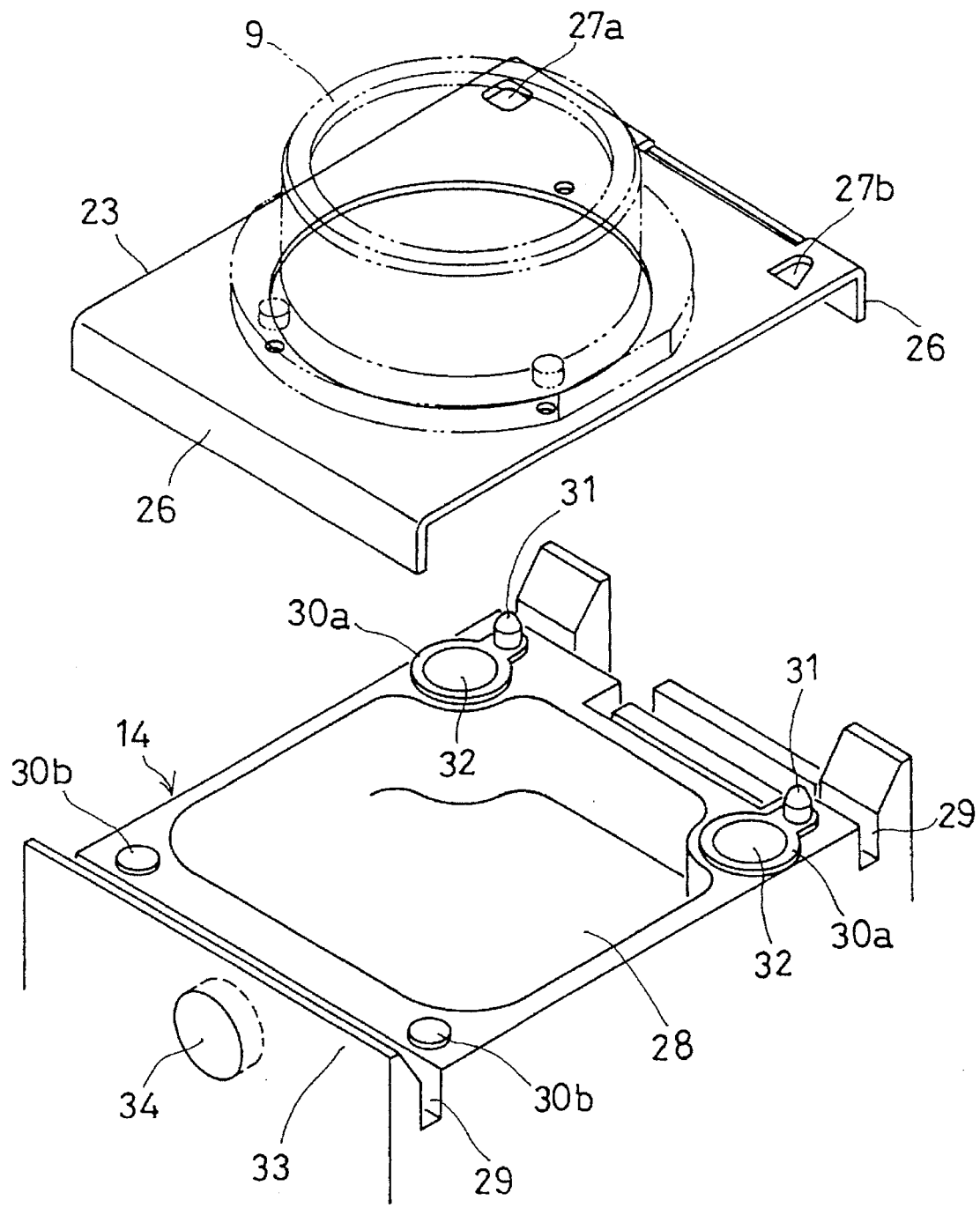
FIG. 4 is an exploded perspective view of a lens support table and lens plate of the same.
Figure 5:
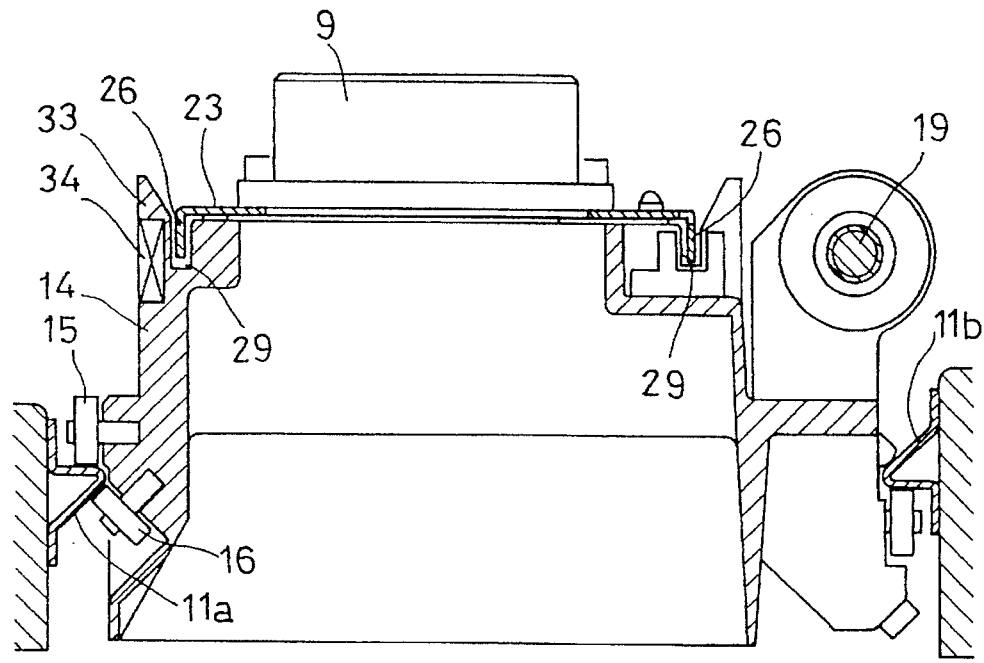
FIG. 5 is a sectional view taken along line V—V of FIG. 3.
Figure 6:
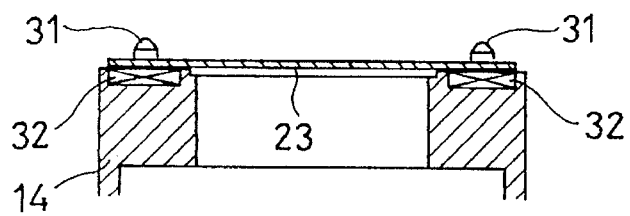
FIG. 6 is a sectional view taken along line VI—VI of FIG. 3.

Referring to FIGS. 3 to 5, the lens support table 14 supports a lens plate 22 carrying the zoom lens 21, a lens plate 23 carrying the varifocal lens 9, and a reflecting mirror 24 provided between the lenses 9 and 21 in an inclined state.

The lens plate 22 carrying the zoom lens 21 and the reflecting mirror 24 are fixed to the lens support table 14.

The varifocal lens 9 is selected from a plurality of lenses having different focal lengths, and is detachably mounted on the lens support table 14 so that it can be replaced with another lens according to the size of the negative film to be printed.

The lens support table 14 is moved by turning the threaded shaft 19 so that a predetermined one of the zoom lens 21, reflecting mirror 24 and varifocal lens 9 is on the optical axis L shown in FIG. 1. By moving the reflecting mirror 24 onto the optical axis L, a scanner 25 provided obliquely downward from the lens support table 14 can read data on negative images on the negative film being fed into the negative mask 8.

The lens plate 23 supporting the varifocal lens 9 is made from a magnetic material, and has bent portions 26 (FIG. 4) along both side edges. Front and a rear positioning holes 27a, 27b are formed in the lens plate 23 along one side edge thereof. The front positioning hole 27a is a square hole, while the rear positioning hole 27b is substantially triangular with one corner rounded off.

A window 28 for exposure is formed in the lens support table 14 at the central portion of the area where the lens plate 23 is superimposed. On both sides of the window 28, the lens support table 14 has grooves 29 which receive the bent portions 26.

Protrusions 30a and 30b are formed on the top surface of the lens support table 14 to support the bottom of the lens plate 23 at the four corners thereof. The front and rear protrusions 30a, which are provided on the higher side of the inclined top surface of the lens support table 14, have positioning pins 31 adapted to be inserted in the positioning holes 27a and 27b. First magnets 32 embedded in the protrusions 30a attract the bottom of the lens plate 23.

A second magnet 34 is provided in an outer wall 33 of a groove 29 formed in the lower side of the inclined top surface of the lens support table 14 to attract one of the bent portions 26 of the lens plate 23. The attracting force of the second magnet 34 is greater than the sum of the attracting forces of the first magnets 32.

To mount the varifocal lens 9, the lens support table 14 is moved by turning the threaded shaft 19 until the varifocal lens mounting portion of the lens support table 14 is brought out of the frame 10.

In this state, the varifocal lens 9 is mounted by dropping the lens plate 23 carrying the lens 9 onto the lens support table 14, thereby engaging the positioning pins 31 in the positioning holes 27a, 27b. While the pins 31 are in the holes 27a, 27b, the second magnet 34 begins to attract the bent portion 26, so that the positioning pins 31 contact the walls of the positioning holes 27a, 27b. This state is maintained when the pins 31 completely fit in the holes 27a, 27b and the lens plate 23 rests on the protrusions 30a, 30b as shown in FIG. 8.

Figure 8:
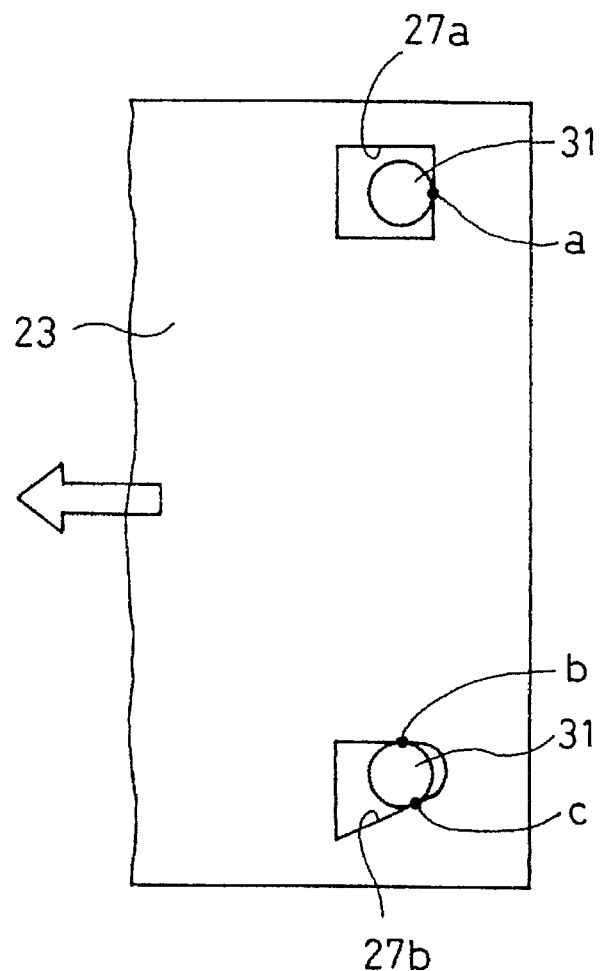
FIG. 8 is a plan view of the lens plate, showing how it is set in position.

Since the lens plate 23 is attracted by the second magnet 34 in the direction of the arrow in FIG. 8, one of the positioning pins 31 contacts one side of the wall of the square positioning hole 27a at point (a), while the other positioning pin 31 contacts the wall of the triangular positioning hole 27b at two points (b) and (c) near the rounded corner.

Thus, the lens plate 23 can be positioned with extremely high accuracy. In this state, the first magnets 32 attract the bottom of the lens plate 23, while the second magnet 34 attracts the bent portion 26, so that the lens plate 23 can be stably held in position on the lens support table 14.

Figure 9A:
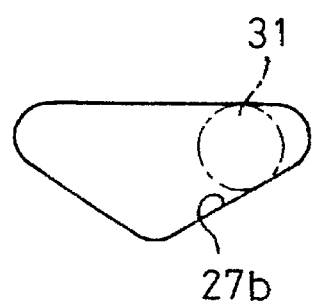
FIGS. 9A and 9B are views of different types of positioning holes.
Figure 9B:
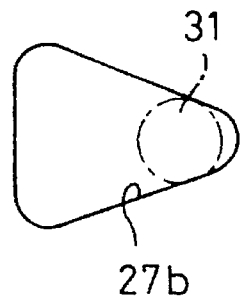
Figure 10:
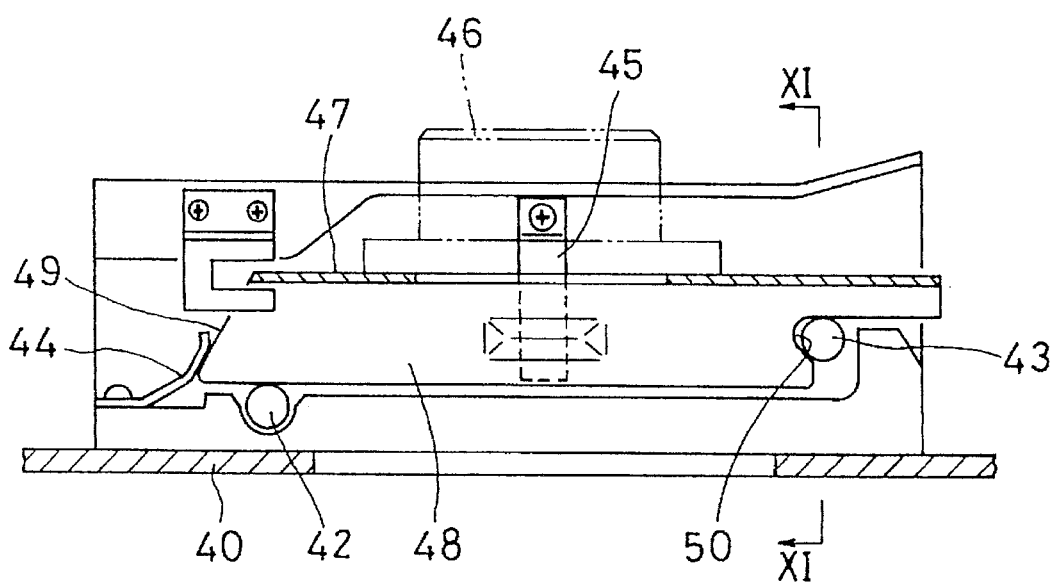
FIG. 10 is a side view in vertical section of a conventional lens supporting assembly.
Figure 11:
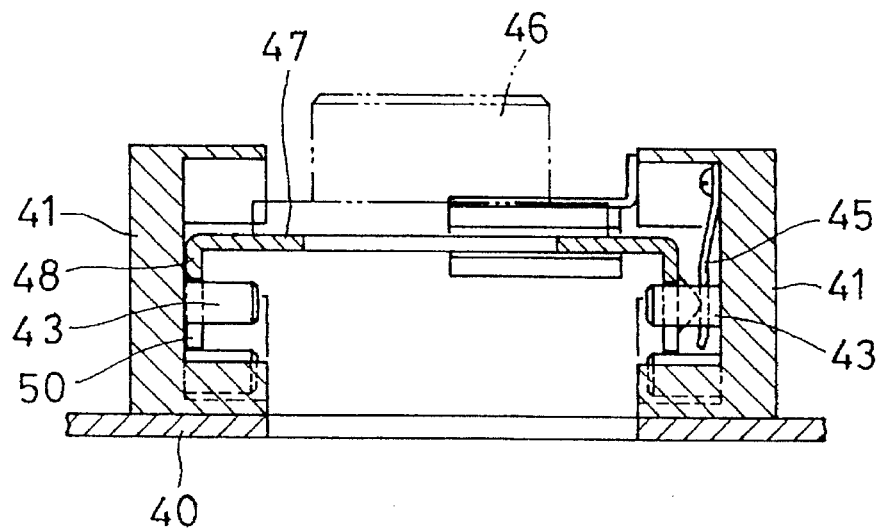
FIG. 11 is a sectional view taken along line XI—XI of FIG. 10.

The triangular positioning hole 27b may have a shape shown in FIG. 9A or 9B.

To remove varifocal lens 9 for replacement, it is held by hand and raised.

With the arrangement of this invention, the lens can be easily attached and detached simply by lowering the lens plate carrying the lens and by raising it. Once mounted, the varifocal lens can be set in position with high accuracy because the positioning pins engage in the positioning holes.

Also, when the lens plate is placed on the lens support table, the first magnets attract the bottom of the lens plate, while the second magnet attracts the bent portion. Thus, the lens can be stably held in position.

There is no need to slide the lens plate and the lens support table relative to each other when attaching and detaching the lens, so that no part is worn. Thus, the lens can be set in position accurately for a long period of time.

What is claimed is:

1. A lens supporting assembly for use in a photoprinting machine, said assembly comprising a lens support table having a window for exposure and arranged to extend across an optical axis of exposure light, and a lens plate carrying a printing lens and detachably mounted on said lens support table, said lens plate having bent portions along both side edges thereof and a plurality of positioning holes, said lens support table having a plurality of positioning pins adapted to be inserted in said positioning holes, said lens support table further having a first magnet for attracting the bottom of said lens plate and a second magnet for attracting one of said bent portions.

* * * * *